United States Patent
Menke

[15] 3,653,768
[45] Apr. 4, 1972

[54] APPARATUS FOR MEASURING THE RANGE OF VISION BY COMPARING A DIRECT AND DISPERSED BEAM OF LIGHT

[72] Inventor: Franz Menke, Neckargemund, Germany

[73] Assignee: Eltro GmbH & Company, Heidelberg, Germany

[22] Filed: Feb. 16, 1971

[21] Appl. No.: 115,432

[30] Foreign Application Priority Data

Feb. 14, 1970 Germany ................. P 20 06 882.0

[52] U.S. Cl. .............................. 356/104, 250/218, 356/205
[51] Int. Cl. ............ G01n 21/00, G01n 21/26, G01n 21/22
[58] Field of Search .......................... 356/104, 205; 250/218

[56] References Cited

UNITED STATES PATENTS 3,415,984  12/1968  Frungel ................................. 356/104
3,420,609  1/1969   Kozawa ................................. 356/104

Primary Examiner—William L. Sikes
Assistant Examiner—Orville B. Chew, II
Attorney—Waters, Roditi & Schwartz

[57] ABSTRACT

A method and apparatus is disclosed which is usable in measuring the range of vision and comprises emitting a light beam from a transmitter for reception by a distant photoelectric receiver and indication on an indicator. A diaphragm serves to alternately feed to the receiver the direct light beam from the transmitter, and the combination of the direct light beam and a dispersed beam and the intensities of the signals are compared and indicated by the indicator.

7 Claims, 6 Drawing Figures

APPARATUS FOR MEASURING THE RANGE OF VISION COMPARING A DIRECT AND DISPERSED BEAM OF LIGHT

BRIEF SUMMARY OF THE INVENTION

The invention relates to a method and an apparatus for measuring the range of vision.

The measurement of distances by means of electro-optical devices is to a great extent dependent on the range of vision. The range of vision is determined by the degree of brightness of an object as perceived by an observer under existing conditions, such as rain, fog, or snow conditions, by dust in the air and other factors.

The known devices use either attenuation of the direct light by absorption, dispersion, or the like, or they only measure dispersed forward light, or direct light from a reflector, or dispersed back light. All of these methods produce insufficient accuracy of measurement, and, moreover, are influenced by contamination of the lenses, as they attenuate both the outgoing and incoming light beams and thus produce incorrect readings. Furthermore, an incorrect reading may be caused by aging of the light source, and by aging of the photoelectric receiver. If all of these influences are considered, an accurate measurement of the range of vision by these methods is not possible.

There are other known measuring methods in which a reflected light beam is compared with direct light. The exactness of measurement is good in these cases. Since a comparative measurement is accomplished, the apparatus is not sensitive to aging of the components because these are included in the same manner in both measured values to be compared.

The same is true for measurements in which the direct light is measured via a reflector against dispersed back light. However, both of the lastly mentioned measuring methods are equally sensitive to contamination of the lenses and hence result in incorrect measurements.

It is an object of the invention to provide a measuring method and a corresponding apparatus which have a high accuracy of measurement, are insensitive to aging of the light source and of the receiving element, in which the contamination of the lenses has no influence on the measurement results.

The invention contemplates a method in which a transmitter emits electromagnetic beams, in particular light beams, these beams being received by a receiver mounted at a distance from the transmitter and being forwarded to an indicating device optionally via an amplifier.

The characteristic feature of the invention is that the direct light beams and the dispersed light beams caused by the elements comprised in the atmosphere, such as fog, rain, snow, or the like, are received separately and their respective intensities are compared with each other.

In such a method, only the ratio of the direct light to the dispersed light is obtained, and it is to be considered that the direct light is already attenuated by absorption and dispersion when it reaches the receiving device. The ratio of both light intensities, which are converted by a photoelectric receiver to electrical values, renders possible the immediate evaluation about the range of sight. Contamination of the lenses of the transmitter or the receiver or both thereof influence the direct light and the dispersed light equally and thus are cancelled in the measured ratio. The same can be said about aging of the light source.

In order to eliminate possible differences in aging of two equal photoelectric receivers, it is proposed in accordance with a further feature of the invention to supply the direct beams and the dispersed beams to the same photoelectric receiver alternately. This can be achieved for instance, by providing two light paths and alternately positioning the photoelectric receiver in one light path or the other or by providing a deviating device in the back of the light paths, which alternately supplies the beams from one light path, and then from the second path, to the photoelectric receiver.

The image emitted by the transmitting device is usually too large to be forwarded directly to the anode of an amplifying tube. In order to receive the whole image, it is proposed in accordance with a still further feature of the invention to provide an objective lens in front of the amplifying tube of the receiving device, which objective lens focuses the incoming beams of the direct light so strongly, that the entire image does not exceed the size of the anode of the amplifying tube. The incoming beams are thus focused on a substantially smaller cross-section. Simultaneously, an increased intensity of the light beams is obtained.

A modulator is suitably arranged in front of the light source of the transmitter. The light beam is thereby divided into individual signals, which can be more easily transformed to electric signals by the photoelectric receiver and ensure a more accurate determination of the produced voltage.

In the proposed comparative measurement, the following ratios may, for example, be obtained:

|  | Clear | Haze | Fog | Heavy fog | Very heavy fog |
|---|---|---|---|---|---|
| Direct light | 100% | 90% | 70% | 60% | 40% |
| Dispersed light | 0% | 10% | 30% | 40% | 60% |
| Direct light / Dispersed light | 100(∞) | 9 | 2.33 | 1.5 | 0.66 |

DETAILED DESCRIPTION

Figure 1:
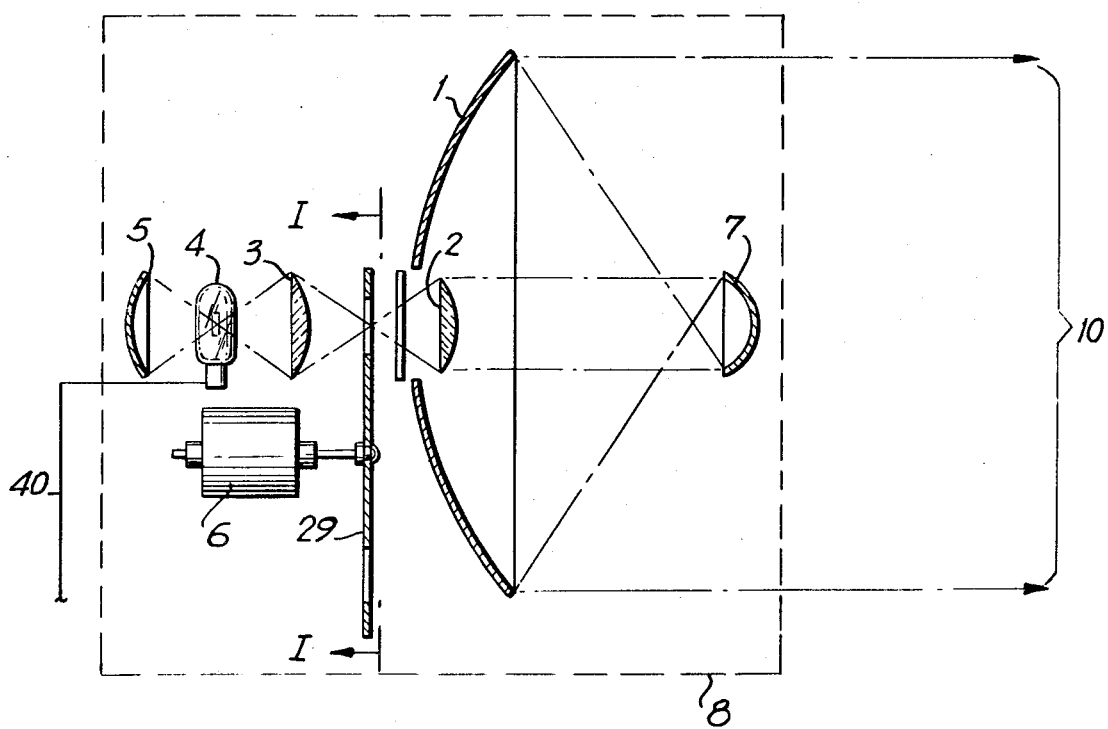
FIG. 1 is a diagrammatic side view of a transmitter which emits modulated light.

In a housing 8 diagrammatically illustrated in FIG. 1, there is provided a projector composed of an intensive light source 4, a concave mirror 5, glass lenses 3 and 2, a secondary mirror 7 and a main mirror 1.

Figure 1A:
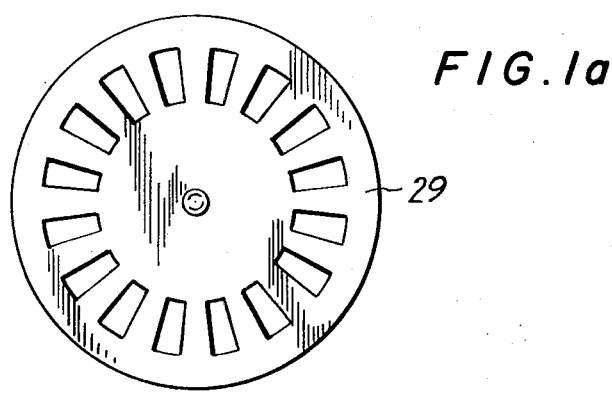
FIG. 1a is an enlarged view of a modulation disc as seen in the section taken along line I—I in FIG. 1.
Figure 2:
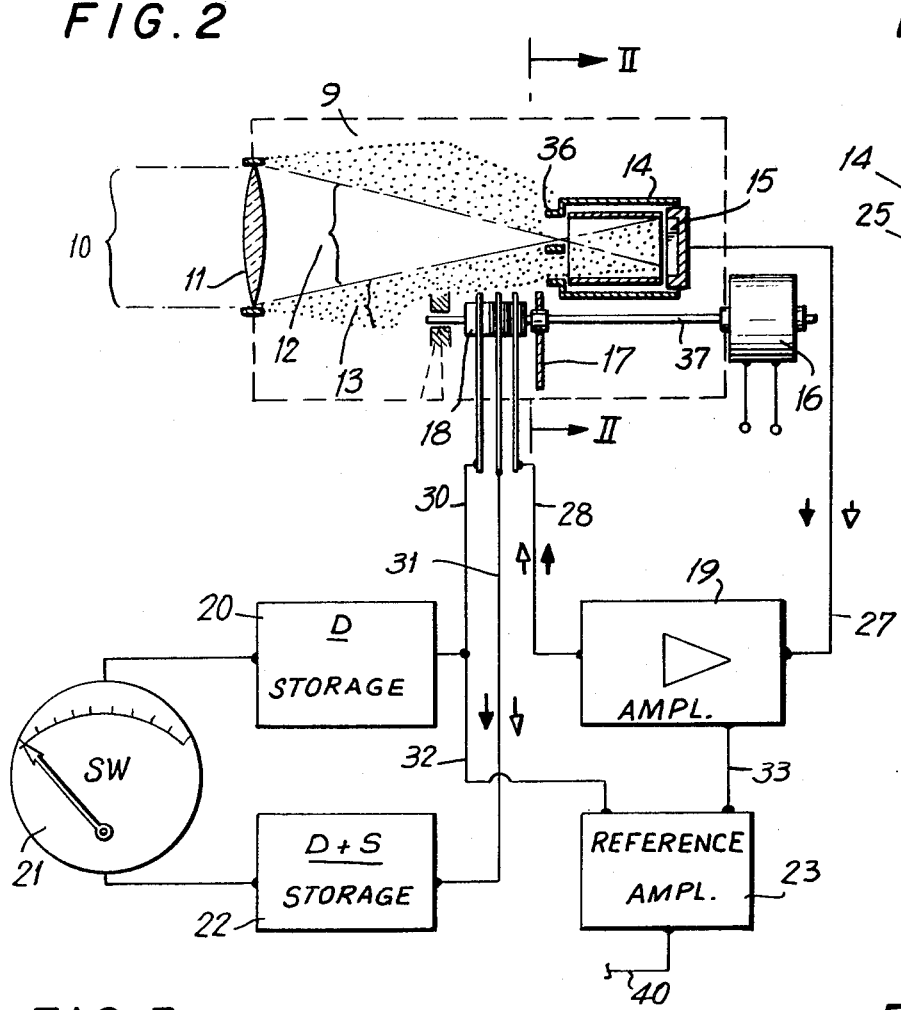
FIG. 2 is a diagrammatic side view of a receiver for the modulated light emitted by the transmitter.
Figure 2A:
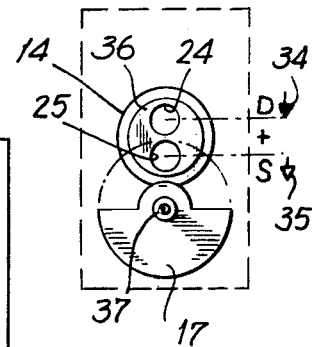
FIG. 2a is a view of the receiver as seen in the section taken along line II—II in FIG. 2.
Figure 3:
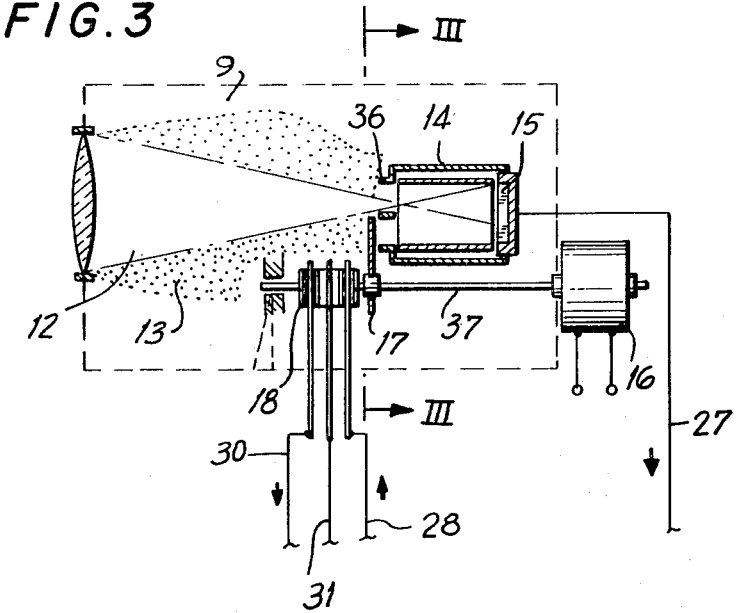
FIG. 3 shows the receiver of FIG. 2 in another operation position.
Figure 3A:
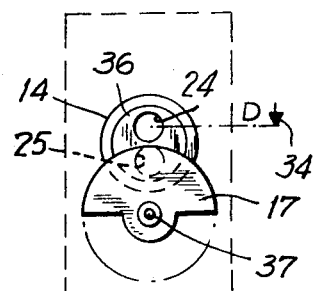
FIG. 3a is a view of the receiver in this other operation position as seen in the section taken along line III—III in FIG. 3.

A parallel directed light beam 10 is emitted in the direction of a receiver 9 by the main mirror 1. A modulation disc 29, is inserted between the lenses 3 and 2, and driven by a motor 6. The disc 29 is slotted around its periphery as shown in FIG. 1a. A receiving device as shown in FIG. 3 comprises an optical objective 11 and a cylinder 14 with a mirrored inner surface and containing a light-sensitive cell 15 serving as a photoelectric detector. The cylinder is closed at the input side by a diaphragm 36 provided with two light input openings 24 and 25. A rotatable diaphragm 17 is mounted in front of the diaphragm 36 and is driven by a motor 16. The diaphragm 17 is seated on a shaft 37 which is arranged outside the cylinder 14 and extends parallel to its axis. The diaphragm 17 has approximately the shape of a semicircular surface as seen in FIGS. 2a and 3a. The size of the diaphragm 17 and the distance of shaft 37 from the axis of the cylinder are such that the diaphragm 17 alternately covers and uncovers the opening 25 of the diaphragm 36 during each revolution thereof. A distributing commutator 18 is mounted on the shaft 37 adjacent the diaphragm 17. The commutator rotates at the same speed and in phase with the diaphragm 17 for a purpose to be explained later.

The receiver 9 is spaced a distance from the projector of, for example, 100 meters. The parallel directed light beam 10 from the projector is transformed into brighter and darker pulses by means of the rotating slotted disc 29.

The bright and dark pulses arrive at the receiver 9 and are centered at the opening 24 of the diaphragm 36 of the cylinder 14 after passing the receiving optical objective 11, as a direct light image of the opening of the projector. Then the light beam reaches the light-sensitive cell 15, where the projector light pulses are transformed into analogous current pulses as indicated by character 34.

The dispersed light beam 13 of the light of the projector may enter the cylinder 14 through the second opening 25 of the diaphragm 36. However, the opening 25 of the diaphragm is uncovered by the rotating diaphragm 17 for the dispersed light beam only periodically. Consequently, the cell 15 alternately registers the direct light D, and the sum of direct light D and dispersed light S. FIG. 3a shows the position of the diaphragm 17 for registration of only the direct light D, whereas FIG. 2a shows the position for the registration of the direct light D + dispersed light S.

The light pulses transformed in the cell 15 to current pulses 34 and 35 are transferred from the cell 15 through the line 27 to an amplifier 19 and then, after being amplified, through the line 28 to the distributing commutator 18, which rotates synchronously with the diaphragm 17. The current pulses D and D+S are alternately forwarded by the commutator 18 to the storage 20 for D and 22 for D+S. A measuring device 21 is inserted between both storages such that it receives current from both storages and measures the difference of their voltages.

A reference amplifier 23 is energized at the same time as the D pulses are distributed by the commutator 18 and by the amplifier 23, the main amplifier 19 is controlled in such a manner that D equals 1. By this measure, it is achieved that the measuring device 21 indicates only the value of the dispersed light (SW) when evaluating the charges of the chargeable storages 20 and 22.

The dial of the measuring device can be divided and calibrated for direct reading of this value with the quotients of D/S "with sight range in m or km" or in "vision stages of range of vision intervals."

The regulating amplifier is connected with the light source 14 of the transmitting device by line 40 so that the power output of the lamp can be adjusted by the amplifier 23 to a lower level if the atmosphere is clear, and to a higher level of the atmosphere is not clear, i.e. foggy, raining or snowing etc.

The advantage of the disclosed method and apparatus for measuring the range of vision is that, for instance, the following parameters have no effect on the measurement of the receiving device: variation of the intensity of the light from the projector lamp 4; aging of the photoelectrical cell 15; influence of daylight; and contamination of the lens 11.

More specifically, as seen in the table previously presented in the specification the factor, $$\frac{\text{Direct light}}{\text{Dispersed light}}$$

decreases from 100 to 0.66 depending on the atmospheric conditions. A certain value of the first line corresponds to each intermediate value between the above two limit values, which value of the first line is obtained by interpolation from the percentual ratios of the first line. The values of the last line can be directly read off on the scale of the measuring instrument of the present invention. The corresponding value of the first line (direct light) can be computed from the read-off value.

At this time, all of the values are determined for a fixed distance of, for instance, 100 m. The range itself is obtained for each of the sight relations of line 1 by positioning a certain object, for instance a rod, at such a distance from the observer that the rod can be recognized with certainty and by a subsequent measuring of the distance between the observer and the object. In this manner, a row of numerical values is obtained of which every one corresponds to a certain numerical value of line 1. The result is the more accurate, the finer the line 1 is divided and, accordingly, the greater is the number of corresponding separate observations.

As only the relation $$\frac{\text{Direct light}}{\text{Direct light} + \text{dispersed light}}$$

is measured, all interference radiations, which interfere equally with both of the lights, are automatically excluded.

What is claimed is:

1. A device for measurement of range of vision comprising a transmitting device for emission of a light beam, a receiving device spaced a distance from the transmitting device for receiving the light beam therefrom, said receiving device including photoelectric means for converting the light beam into an electrical signal, a stationary diaphragm and a rotatable diaphragm arranged in front of the photoelectric means, said stationary diaphragm being provided with a first opening for entry of direct light from the transmitting device and a second opening for entry of dispersed light, said rotatable diaphragm being of semi-circular shape to alternately cover and uncover said second opening during each revolution of said rotatable diaphragm, a first storage means for receiving direct light signals from said photoelectric means, a second storage means for receiving the sum of the direct light signals and the dispersed light signals, switch means for alternately supplying the direct signals to the first storage means and the sum of the direct and dispersed light signals to the second storage means and indication means coupled to the storage means.

2. A device according to claim 1 comprising an amplifier between said switch means and said photoelectric means.

3. A device according to claim 1 wherein said switch means comprises a commutator driven in synchronization with said rotatable diaphragm.

4. A device according to claim 1 comprising an objective disposed in front of said diaphragms for focussing the light beam from the transmitting device to said photoelectric means.

5. A device according to claim 1 wherein said transmitting device includes a light source and a modulator for producing spaced light pulses.

6. A device according to claim 5 comprising a reference amplifier connected to the first amplifier and in parallel with the first storage means to forward to said first storage means a direct light signal always having a value of unity.

7. A device according to claim 6 comprising means connecting the reference amplifier and the light source to control the intensity of the latter.

* * * * *